United States Patent [19]

Peterson

[11] Patent Number: 4,752,328

[45] Date of Patent: Jun. 21, 1988

[54] SPENT SALT FLUX RECYCLING

[75] Inventor: Ray D. Peterson, Florence, Ala.

[73] Assignee: Reynolds Metals Company, Richmond, Va.

[21] Appl. No.: 109,889

[22] Filed: Oct. 19, 1987

[51] Int. Cl.$^4$ ............................................. C21B 3/04
[52] U.S. Cl. ........................................ 75/24; 75/63; 75/93 AC; 75/68 R
[58] Field of Search .................... 75/68 R, 93 AC, 24, 75/63

[56] References Cited

U.S. PATENT DOCUMENTS

| | | | |
|---|---|---|---|
| 3,660,076 | 5/1972 | Williams | 75/68 R |
| 3,798,024 | 3/1974 | Murphy et al. | 75/68 R |
| 3,955,969 | 5/1976 | Johnson | 75/68 R |
| 4,030,914 | 6/1977 | Papafingos et al. | 75/68 R |
| 4,033,760 | 7/1977 | Lance et al. | 75/68 R |
| 4,073,644 | 2/1978 | Papafingos et al. | 75/24 |
| 4,108,635 | 8/1978 | Reynolds | 75/24 |
| 4,252,776 | 2/1981 | Huckabay et al. | 423/111 |
| 4,368,070 | 1/1983 | Fracchia | 75/0.5 B |
| 4,379,718 | 4/1983 | Grantham et al. | 75/93 AC |
| 4,386,956 | 6/1983 | Roth et al. | 75/24 |
| 4,418,892 | 12/1983 | Howell | 266/137 |

*Primary Examiner*—Deborah Yee
*Attorney, Agent, or Firm*—Alan T. McDonald

[57] ABSTRACT

Spent salt flux from aluminum production has its oxides, aluminum and salt components recovered by dissolving the soluble components in water and evaporating the water to recover the salt components thereof while screening and crushing the insoluble components to separate the aluminum and oxides.

7 Claims, 1 Drawing Sheet

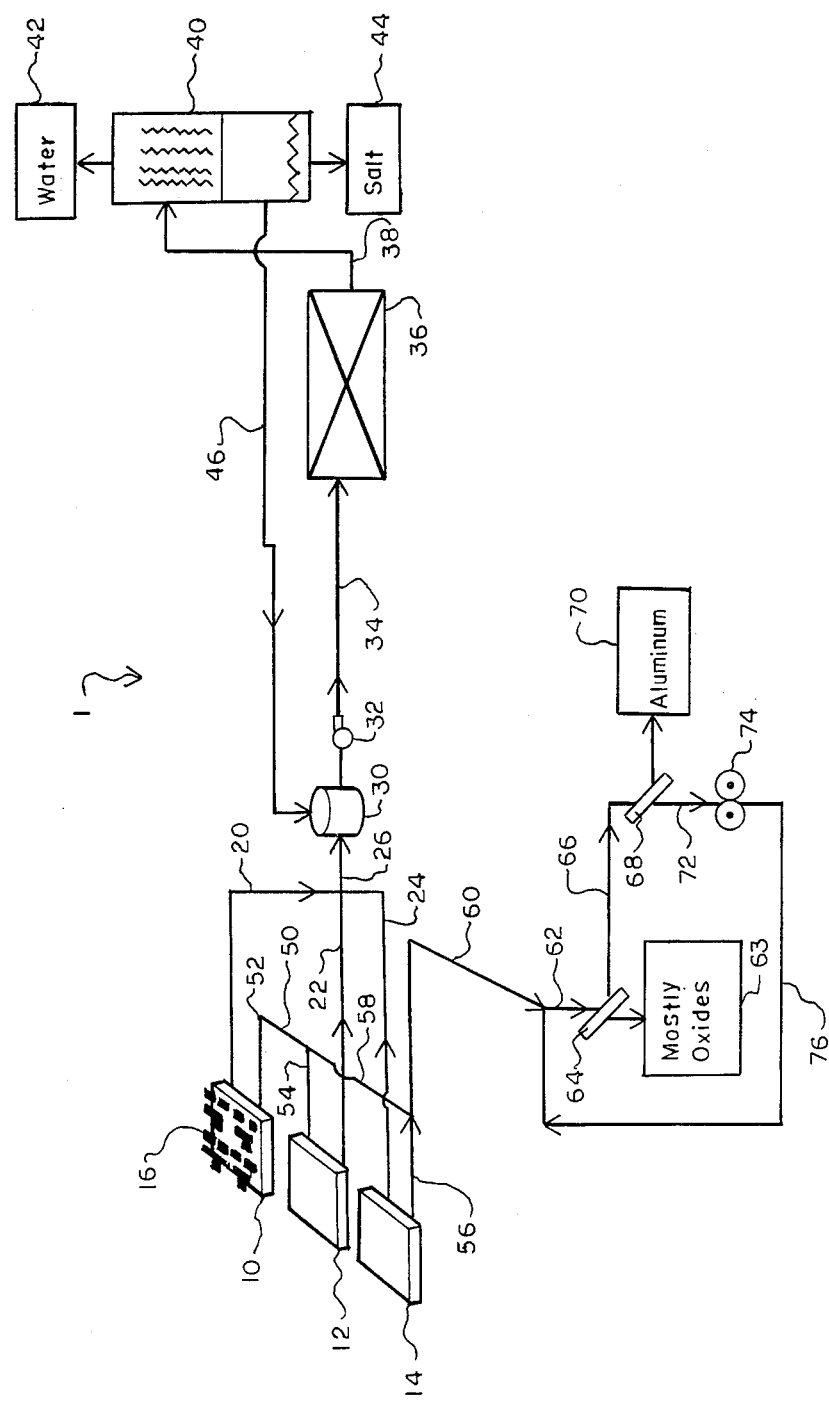

SPENT SALT FLUX RECYCLING

BACKGROUND OF THE INVENTION

In the casting of aluminum ingots, the molten aluminum metal is maintained in a molten state in a holding furnace. Over time, a surface residue, or white dross, accumulates and must be skimmed from the surface of the molten metal. The white dross contains valuable materials which are recoverable by recycling processes. Typically, the white dross skimmings from a casthouse furnace may contain from about 30 to about 70% by weight aluminum, from about 20 to about 40% by weight oxides, from about 0 to about 6% by weight salts and from about 0 to about 4% by weight aluminum nitride. The oxides portion of white dross may contain from about 20 to about 40% $Al_2O_3$, from about 15 to about 30% $Al(OH)_3$, from about 0 to about 3% by weight MgO, and from about 15 to about 30% by weight $Al_2MgO_4$. The salts component is a mixture of NaCl and KCl.

This dross is treated with a salt flux which is a eutectic composition of KCl and NaCl, typically about 50 to 70% potassium chloride and about 30 to 50% sodium chloride, with an optional amount of up to about 5% by weight $Na_3AlF_6$, in a rotary barrel furnace. Thus, for example, about 24,000 pounds of dross and about 13,200 pounds of salt flux are treated to remove the aluminum therefrom, yielding about 31,200 pounds of spent salt flux per cycle.

Traditionally, spent salt flux is permitted to solidify and sent to landfill for disposal. Thus, while spent salt flux contains valuable materials that could be recovered, it is currently the practice to pay to remove spent salt flux from its production site. It is also known to send spent salt flux to commercial salt recovery plants for recovery by milling, leaching, filtering and the like, but such recovery is very expensive, both in capital and processing costs.

It would make economic sense, therefore, to provide a low cost and low capital investment system to recover the valuable material components of spent salt flux, which would not only eliminate the cost of transporting and storing the material at a landfill or of expensive recovery at a traditional commercial salt recovery plant but at the same time result in a net cost savings by recovering valuable components of the spent salt flux for reuse.

THE PRESENT INVENTION

By means of the present invention, these desired goals are obtained. According to the present invention, solidified spent salt flux is treated with water over time to dissolve the soluble components of the spent salt flux. The water containing the soluble components of the spent salt flux is heated to evaporate the water component and recover the salt components in solid form. At the same time, the insoluble portion of the spent salt flux is subjected to a series of screening and crushing operations to isolate the oxide and aluminum components of the spent salt flux. Practice of the present invention allows additional recovery of aluminum from the white dross, as well as recovery of additional valuable materials, while eliminating or reducing substantially the need for costly disposal of the spent salt flux.

BRIEF DESCRIPTION OF THE DRAWINGS

The spent salt flux recovery system of the present invention will be more fully described with reference to the FIGURE which is a schematic diagram of the processing of spent salt flux according to the practice of the present invention.

DETAILED DESCRIPTION OF THE PREFERRED EMBODIMENTS

Turning now to the FIGURE, a spent salt processing system 1 is illustrated. Solidified spent salt flux 16, which is in the form typically of solid cakes or blocks, is positioned on a containment pad 10. The containment pad 10 is a waterproof surface upon which the blocks 16 of spent salt flux may rest and is preferably slightly inclined to provided runoff of water from the containment pad 10. The pad 10 may be formed from such waterproof materials as plastic film, asphalt, concrete, clay and the like. As illustrated, three pads 10, 12 and 14 may be employed. One of the pads would be in the process of treating spent salt flux blocks 16, one of the pads would be drying the residues from treatment of the spent salt flux blocks 16 and the other would be being loaded with spent salt flux blocks 16 for subsequent treatment. Of course, more or less pads similar to pad 10 could be employed, based upon the quantity of material to be treated by the facility.

The pad 10, 12 or 14 which is currently treating spent salt flux blocks 16 would do so in the following manner. A water spray, such as a sprinkler system, sprays water onto the blocks 16 on the containment pad 10, 12 or 14, with the water running off of the containment pad being fed through lines 20, 22, 24 and 26 to a storage tank 30. It is estimated that approximately 270 gallons of water is required to completely dissolve the soluble components of one ton of spent salt flux. Using sprinklers applying water at a rate of one liter per hour, a one ton block would dissolve in approximately 9.2 days. Thus, the rate of water spray to the containment pad 10, 12 or 14 would be adjusted based upon the quantity of spent salt flux loaded to the containment pad and the speed of desired recovery. Of course, it is entirely possible that this process may be accomplished out of doors and that rain water may add to the dissolution of the spent salt flux. However, it is impractical to rely upon rain water alone to accomplish this process. The sprinklers employed may be, for example, polyvinyl chloride tubes or pipes having holes therein. Such a system is relatively lightweight and may be moved from pad to pad if necessary.

After the spent salt flux of a given pad has been completely dissolved, its insoluble components are allowed to dry on the pad. This remainder then removed to the solid recovery section of the system. As illustrated, this is shown as moving through lines 50, 52, 54, 56, 58 and 60, which may be conveyors or the like or may just schematically represent the movement of this component away from the pads to the solid recovery system.

The solid and liquid recovery systems operate on the solid and liquid components produced by the dissolution of the spent salt flux. As previously mentioned, the salt containing water passes to storage tank 30. At this point it is pumped, such as by means of pump 32, along line 34 and may be preheated by a heater 36, such as a flue gas heater from other operations of a plant, and passed to an evaporator 40. At evaporator 40, pure water 42 is evaporated and the solidified salt 44 is recovered. Salt containing water, or brine, may be recycled from evaporator 40 through line 46 back to storage tank 30 to assure that complete salt recovery has been accomplished.

Running independently of the liquid recovery system is the solid recovery system. At entry point 62, the dried remainder from the dissolution of the spent salt flux is passed to an initial relatively fine screen 64, which may be, for example, a 4 to 20 mesh screen. The fine material which passes through the fine screen 64 will be nearly all oxides which can be sold, used in other industrial processes or landfilled. If landfilled, the remainder may no longer be considered a hazardous or noxious waste, as is spent salt flux. Of course, the amounts of materials being landfilled is significantly less than would have been landfilled had the spent salt flux been landfilled. The material that remained on the fine screen 64 is passed, such as by a conveyor 66, to a relatively coarse screen 68, such as a ½ inch to 8 mesh screen. The material retained on the coarse screen is a very pure aluminum feed 70. The material which is retained by the fine screen 64 but which passes through the coarse screen 68 is a mixture of oxides and aluminum and is passed, such as by conveyor 72, through a roll crusher 74 and through conveyor 76 back to the entry point 62 of fine screen 64. The roll crusher 74 will crush any remaining oxide to a fine pulverized state such that it will now pass through the fine screen 64 and at the same time flattens out the aluminum particles so that these particles will be retained on the coarse screen 68.

It is optional that the brine component which has been removed from pads 10, 12 or 14 could be sent to a thickening or settling pond or the like prior to its passing to storage tank 30 for evaporation. This will permit any suspended oxides which were carried with the brine solution to be settled out of the brine prior to its treatment, thus providing a purer salt recovery. Such a pond may be formed in conjunction with or positioned at least immediately adjacent pad 10 such that the brine from pad 10 flows directly into the pond, eliminating the need for any piping or pumping to the pond.

From the foregoing, it is clear that the present invention provides a simple yet effective means for recovering the valuable components of spent salt flux thus permitting these materials to be reused at an economic benefit rather than being discarded at an economic cost.

While the invention has been described with reference to a certain specific embodiment thereof, it is not intended to be so limited, except as set forth in the accompanying claims.

I claim:

1. A method of recovering aluminum, oxide and soluble components from spent salt flux produced in an aluminum dross treatment comprising solidifying said flux, passing said flux to a waterproof surface, spraying said flux with water to dissolve said soluble components of said flux and form a brine, removing said brine and then drying said aluminum and oxide components of said flux, evaporating said water from said brine to thereby recover said soluble components and screening and crushing said aluminum and oxide components to separate and recover said aluminum component and oxide component.

2. The method of claim 1 wherein said screening and crushing comprises an initial fine screening, a coarse screening of material remaining from said fine screening, crushing of material passing through said coarse screening and rescreening of the crushed material.

3. The method of claim 1 further comprising passing said brine to a settling pond prior to said evaporating to remove insoluble material carried from said flux with said brine.

4. The method of claim 1 wherein said evaporating includes heating said brine with flue gas from another industrial process.

5. The method of claim 1 wherein said waterproof surface is formed from plastic film, asphalt, concrete, or clay.

6. The method of claim 2 wherein said fine screening employs a screen of from about 4 to 20 mesh.

7. The method of claim 6 wherein said coarse screening employs a screen of from about ½ inch to 8 mesh.

* * * * *